United States Patent
Van Hoof et al.

[11] Patent Number: 6,067,406
[45] Date of Patent: May 23, 2000

[54] AUTOMATIC CALIBRATION FOR OUTPUT DEVICES BASED ON DEVICE OUTPUT MODE

[75] Inventors: Hubert Van Hoof, Heist-op-den-Berg; Paul Adriaensen, Borsbeek, both of Belgium

[73] Assignee: Agfa-Gevaert N.V., Mortsel, Belgium

[21] Appl. No.: 08/637,066

[22] Filed: Apr. 24, 1996

[30] Foreign Application Priority Data

May 3, 1995 [EP] European Pat. Off. ............. 95201149

[51] Int. Cl.[7] ...................................... H04N 1/40
[52] U.S. Cl. ...................... 395/109; 395/112; 358/456; 358/406; 358/455; 358/534; 358/536; 358/504; 358/523
[58] Field of Search .................... 358/456, 459, 358/406, 458, 468, 455, 536, 534, 535, 504, 298, 523, 501, 518, 527; 395/116, 109, 112, 117; 347/184

[56] References Cited

U.S. PATENT DOCUMENTS

| | | | |
|---|---|---|---|
| 4,516,135 | 5/1985 | Todoh | 347/184 |
| 5,187,594 | 2/1993 | Deutsch et al. | 358/459 |
| 5,276,535 | 1/1994 | Levien | 358/456 |
| 5,291,311 | 3/1994 | Miller | 358/456 |
| 5,297,058 | 3/1994 | Samworth | 358/456 |
| 5,299,020 | 3/1994 | Carlebach | 358/536 |
| 5,363,318 | 11/1994 | McCauley | 358/519 |
| 5,367,387 | 11/1994 | Yamaguchi | 358/523 |
| 5,390,036 | 2/1995 | Buhr et al. | 358/518 |

FOREIGN PATENT DOCUMENTS

| | | |
|---|---|---|
| 0 334 518 | 9/1989 | European Pat. Off. . |
| 0 533 593 | 3/1993 | European Pat. Off. . |
| 0 538 901 | 4/1993 | European Pat. Off. . |
| 2 174 265 | 3/1986 | United Kingdom . |

*Primary Examiner*—Edward L. Coles
*Assistant Examiner*—Cheukfan Lee
*Attorney, Agent, or Firm*—Edward L. Kelley

[57] ABSTRACT

The output mode of an output device for rendering electronic images on an output medium may be characterized by different user-selectable settings such as: paper type, ink type, etc. Apart from the screen characteristics such as screen ruling, frequency and angle, a calibration curve can be communicated via the page description language (e.g. PostScript Level 2) for each color component. Sets of calibration curves can be prepared for specific types of rendering, and be referenced by name. By this name indirection and by naming conventions based upon the output mode or screening parameters, calibration changes can be introduced quickly and consistently.

31 Claims, 4 Drawing Sheets

```
%!PS-Adobe-3.0 Resource-RulingMap
%%BeginResource: RulingMap AgfaBalanced
/AgfaBalanced<<
/ResourceInfo
    <<
        /Name (AgfaBalanced)
        /Version (1.0.0)
        /Date (3/10/94)
        /Creator (AgfaSet / Agfa-Gevaert N.V. EPS/MO-R&D)
        /Copyright ((c) 1994 Agfa-Gevaert N.V.)
    >>
1200
<<
   65 (ABS_TRAD_1200_65_RND)
   75 (ABS_TRAD_1200_75_RND)
   85 (ABS_TRAD_1200_85_RND)
  100 (ABS_TRAD_1200_100_RND)
  110 (ABS_TRAD_1200_110_RND)
  120 (ABS_TRAD_1200_120_RND)
  140 (ABS_TRAD_1200_140_RND)
>>
1800
<<
  133 (ABS_TRAD_1800_133_RND)
  150 (ABS_TRAD_1800_150_RND)
  102 (CR_28_1800_PC4)
  105 (CR_28_1800_PC1)
  106 (CR_28_1800_PC2)
  107 (CR_28_1800_PC3)
  112 (CR_28_1800_UNC)
>>
2400
<<
   85 (ABS_TRAD_2400_85_RND)
  100 (ABS_TRAD_2400_100_RND)
  110 (ABS_TRAD_2400_110_RND)
  120 (ABS_TRAD_2400_120_RND)
  133 (ABS_TRAD_2400_133_RND)
  140 (ABS_TRAD_2400_140_RND)
  150 (ABS_TRAD_2400_150_RND)
  175 (ABS_TRAD_2400_175_RND)
  200 (ABS_TRAD_2400_200_RND)
  102 (CR_21_2400_PC4)
  105 (CR_21_2400_PC1)
  106 (CR_21_2400_PC2)
  107 (CR_21_2400_PC3)
  112 (CR_21_2400_UNC)
  125 (CR_31_2400_PC1)
  126 (CR_31_2400_PC2)
  127 (CR_31_2400_PC3)
  113 (CR_31_2400_UNC)
>>
3000
<<
  150 (ABS_TRAD_3000_150_RND)
  175 (ABS_TRAD_3000_175_RND)
  200 (ABS_TRAD_3000_200_RND)
>>
3600
<<
  133 (ABS_TRAD_3600_133_RND)
  140 (ABS_TRAD_3600_140_RND)
  150 (ABS_TRAD_3600_150_RND)
  175 (ABS_TRAD_3600_175_RND)
  200 (ABS_TRAD_3600_200_RND)
  225 (ABS_TRAD_3600_225_RND)
  250 (ABS_TRAD_3600_250_RND)
  300 (ABS_TRAD_3600_300_RND)
  102 (CR_14_3600_PC4)
  105 (CR_14_3600_PC1)
  106 (CR_14_3600_PC2)
  107 (CR_14_3600_PC3)
  112 (CR_14_3600_UNC)
>>
>>
/RulingMap defineresource pop
%%EndResource
```

FIG. 2a

```
%!PS-Adobe-3.0 Resource-RulingMap
%%BeginResource: RulingMap Accurate
/Accurate<<
   /ResourceInfo
   <<
      /Name (Accurate)
      /Version (1.0.0)
      /Date (3/10/94)
      /Creator (AgfaSet / Agfa-Gevaert N.V. EPS/MO-R&D)
      /Copyright ((c) 1994 Agfa-Gevaert N.V.)
   >>
   0
   <<
      0 (AS)
   >>
   1200
   <<
      0(AS)
      85   (AS_TRAD_1200_85)
      100 (AS_TRAD_1200_100)
      120 (AS_TRAD_1200_120)
      133 (AS_TRAD_1200_133)
   >>
   2400
   <<
      0(AS)
      100 (AS_TRAD_2400_100)
      120 (AS_TRAD_2400_120)
      133 (AS_TRAD_2400_133)
      150 (AS_TRAD_2400_150)
      175 (AS_TRAD_2400_175)
   >>
   3600
   <<
      0 (AS)
      150 (AS_TRAD_3600_150)
      175 (AS_TRAD_3600_175)
      200 (AS_TRAD_3600_200)
      212 (AS_TRAD_3600_212)
      225 (AS_TRAD_3600_225)
      250 (AS_TRAD_3600_250)
   >>
/RulingMap defineresource pop
%%EndResource
```

*FIG. 2b*

```
%%!PS-Adobe-3.0 Resource-RulingMap
%%BeginResource: RulingMap Standard
/Standard<<
        /ResourceInfo
        <<
                /Name    (Standard)
                /Version   (1.0.0)
                /Date    (3/10/94)
                /Creator   (AgfaSet / Agfa-Gevaert N.V. EPS/MO-R&D)
                /Copyright   ((c) 1994 Agfa-Gevaert N.V.)
        >>
        0
        <<
           0  (STD)
        >>
>>
/RulingMap defineresource pop
%%EndResource
```

*FIG. 2c*

AUTOMATIC CALIBRATION FOR OUTPUT DEVICES BASED ON DEVICE OUTPUT MODE

FIELD OF THE INVENTION

The present invention relates to devices and methods for rendering continuous tone images on hard copy, which can be applied in the field of electronic pre-press or electronic publishing.

BACKGROUND OF THE INVENTION

In electronic pre-press systems or for desktop publishing, images are usually offered in electronic form, and are then referred to as electronic images. These electronic images can be obtained by scanning photographic images by an electronic image scanner or by capturing a scene in an electronic camera. These electronic images can be stored permanently on magnetic disk, which can be inserted in a layout system. Alternatively, the electronic images can be transported via direct links or networks to the layout system. On the layout system, one or more electronic images or portions thereof can be inserted interactively in a layout for a page, for printing a reproduction of the electronic image. The creation of a page layout results in an electronic data stream or electronic file describing the several elements of the page layout in electronic format. This electronic page layout is usually expressed in a page description language such as POSTSCRIPT (trademark of Adobe Systems Incorporated). AGFASCRIPT (trademark of Agfa-Gevaert A.G., Leverkusen in Germany) etc. The electronic page layout comprises the data for each electronic image that must appear on the printed reproduction. Usually the electronic images are continuous tone, which is imagery containing multiple grey levels with no perceptible quantisation to them. These continuous tone or contone images can be black and white or colour images. An electronic colour image is separated in a set of colour components. Each electronic colour component is equivalent with a black and white contone electronic image. Printing each colour component on top of each other, using the appropriate coloured ink for that colour component, gives a reproduction of the electronic colour image. The separation process of an electronic colour image into electronic colour components is a transformation achieved by a colour management system, which must know about the characteristics of the different coloured inks and makes some assumptions about the relation between grey levels and densities. A printing device must thus be capable to accept one or more electronic colour components and render it on hardcopy using the appropriate ink. This ink is black for black and white image reproductions, and is usually cyan, magenta, yellow and black for the different colour components of colour images. Such a printing device converts each electronic grey level, which is usually an eight bit number having a value N between 0 and 255, to a visual density on the hard copy. This density D is defined as the negative base ten logarithm of the portion of reflected or transmitted light from incident light on the hard copy, and can be measured by a densitometer. The relation between the grey level N and the density D is strongly dependent on the output device. In order to get the same reproduction from the same electronic page layout on different output devices, not the grey level N is fed directly to the printing device, but a stimulus value S is applied to the printing device. The stimulus value S is derived from the grey level N in such a manner that after transformation of the stimulus S to a density D by the printing device, a specific relation exists between the grey level N and the resulting density D. This is called linearization of the printing device, and is thus achieved by establishing a device specific relation between the grey level N and the device stimulus S. This relation is referred to as a tone curve or a transfer function. It is known in the art that most printing devices have a device specific transfer function incorporated, obtained by calibration. Each time when electronic contone images are printed on this device, the same device specific transfer function is applied to the grey levels of the electronic image. This linearization is also a necessary condition for the proper behaviour of the colour management system.

Problems arise when the output mode of the output device changes. One output device can for example render electronic images on transparent photographic film or on photographic paper or on another output medium. The term medium or media indicates the physical material on which the output appears (paper, transparency material, film, or whatever). It is also possible that the sensitometric properties of the photographic emulsions are different for different types of film. In such a case, an operator has to calibrate the printing device again for establishing another transfer function and install this transfer function in the device. This way of working is very problematic when different output media can easily be exchanged.

In electronic pre-press systems, the output mode of the output device can even be influenced by other factors. Such an output device has to produce a photographic output with halftone pictorial, which is composed ideally of only two grey levels: black and white. In order to reproduce continuous tone imagery, the illusion of continuous tone for the human visual system is achieved by halftoning or screening. A whole technology of screening techniques has been developed over several years, an overview of which can be found in "Evaluation of Clustered-Dot Halftoning Technology in the American Patent Literature" by Peter R. Jones and in "A Survey of Electronic Techniques for Pictorial Image Reproduction" by J. C. Stoffel et al., published in IEEE Transactions on Communications, vol. COM29, no. 12, December 1981 on pages 1898–1925. On one single graphical recorder or output device, a choice of several screening techniques can be offered, such as autotypical screening or frequency modulated halftone screening. When using different types of screening on the same output device, even with the same output media, differences in density reproduction are obtained. Even the line ruling or screening angle in autotypical rasters can influence the density reproduction. This poses not only problems for the colour management system, but also for the same electronic page layout, the outcome of which strongly depends on the screening parameters, which are usually defined in one of the last stages of the electronic pre-press workflow. The problem becomes even more difficult to solve or very conspicuous when it is not properly solved in the case where two electronic images to be rendered on the same page must be screened by different screening techniques. This is true for as well black and white images as for colour images. EP-A-0 334 518, EP-A-0 538 901, EP-A-0 533 593, GB-A-2,174,265 and U.S. Pat. No. 4,516,135 disclose analoguous techniques for making use of tone transformation.

OBJECTS OF THE INVENTION

It is therefore a first object of the invention to provide a method to render electronic images on a hard copy by an output device, in which the relation between image levels and densities on the hard copy is independent from the output mode of the output device.

It is a further object of the invention to provide a method, wherein different users can access the same output device, without concerning the output mode in which they want to use the output device.

Further objects and advantages of the invention will become apparent from the description hereinafter.

SUMMARY OF THE INVENTION

A method is provided for rendering a page image description for an output device having a plurality of output operating modes. The steps of the method include, selecting a particular output device and a particular output mode of operating the output device and selecting a tone transfer function specifically calibrated for rendering the page image with the output device operating in the selected output node.

The user creating the electronic page layout may not consider in the first place which output device is selected to render the layout on hard copy. Once an output device is selected for rendering the layout, the output mode can be established, within the capabilities of the output device. Even at that stage, the operator selecting the output device has not to tale care of any transfer function. Once the output mode is established, one or more appropriate transfer functions can be selected based upon the output mode. For the selection of the transfer function, no human interaction is necessary because the selection can be derived from the output mode parameters. This opens the way for different operators working on distributed systems for defining the output mode of the same output device. A set of transfer functions can be stored close to or within the output device. This set can be accessed by any electronic page layout file, completed with the specific output mode parameters. This makes the completed electronic page layout also less time dependent. If for some reason the output characteristics of the output device change between layout completion and rendering, this change can be taken care of in the transfer function set by one central system administrator. Due to the fact that no human interaction is necessary for selecting the appropriate transfer function, several different jobs can be printed seamlessly one after the other. Moreover, different types of screening or screening with different parameters can be applied on the same hard copy page, without influencing the density distribution.

The output mode of the output device comprises at least one of the following elements or equivalents thereof:

The output device identification.

The media on which the output device produces the hard copy. This may be photographic film or paper, thermal paper, plain paper, or even more precisely specified by film type or batch number.

The press on which the rendered image is intended to be printed.

A process colour or spot colour ink or toner to be used for printing the reproduction.

An identification of the pre-press activities before effective printing, such as direct to plate technology, intermediate contact copies etc.

The screening technology such as accurate screening and ordinary halftoning as defined by Adobe in the PostScript Language Reference Manual (Second edition) page 316; Rational Tangent Screening; Agfa Balanced Screening as described in U.S. Pat. No. 5,155,599; Agfa CRISTALRASTER (tradename of Agfa-Gevaert N.V.), Linotype Hell Diamond screening, UGRA Velvet Screen, Scitex Fulltone Screen or any other type of halftoning.

The line ruling or halftone dot frequency where such applies to the screening technology.

The screening angle where such applies to the screening technology.

The dot shape or spotfunction where such applies to the screening technology.

The type of threshold array used where such applies to the screening technology. The threshold array selected can depend on the electronic colour component, such as in CristalRaster technology.

The output device resolution, i.e. the recorder pitch or distance between two consecutive microdots.

Degree of microdot repetition.

The positive or negative video rendering of the device.

The screening parameters are confined to the following concepts defined above or their equivalents: the screening technology, line ruling, screening angle, dot shape, type of threshold array, output device resolution, degree of microdot repetition and video rendering.

The halftoning process is not restricted to binary halftoning. In modern electrographic devices, such as the CHROMAPRESS system (Tradename of Agfa-Gevaert N.V. in Mortsel, Belgium) the density rendering capability has been extended to 64 different levels per colour component. Preferably, sixteen from the 64 levels are selected for consistent reproduction. The way this device is operated by use of multilevel halftoning is described in detail in EP-A-0 634 862.

A transfer function adjusts the device grey or colour component values, to compensate for peculiarities of the output device such as non-linear grey-level response. Use of the transfer function can be made by adjusting the values of the corresponding colour component. Preferably the transfer function is applied after performing conversion between colour spaces if necessary and before applying the halftone function if necessary. A separate transfer function applies to each colour component. There is no interaction between components imposed by a transfer function. It is however possible that identical transfer functions are applied to different colour components.

For a page description language such as PostScript, a transfer function may be a language procedure, that can be called with an input number in the range e.g. 0.0 to 1.0 and returns an output number in e.g. the same range. The input number is the value of a colour component in the device's native colour space, either specified directly or produced by conversion from some other colour space. The output number is the transformed value that is to be transmitted to the device as a device stimulus value.

The transfer function may also be defined by a look up table with grey levels as entries and stimulus values as output. If not for every possible grey level an entry is present in the look up table, the transformation value for the missing grey levels may be obtained by linear interpolation, spline interpolation, or approximation by e.g. (piecewise) polynomial functions with e.g. least squares approximation.

Using the transfer function may also be accomplished by incorporating the transfer function in the screening process. The threshold values in the threshold array can be subjected to the inverse of the transfer function before comparison for halftoning or the threshold array can be pre-computed based on the inverse of the transfer function.

DETAILED DESCRIPTION OF THE INVENTION

Figure 1:
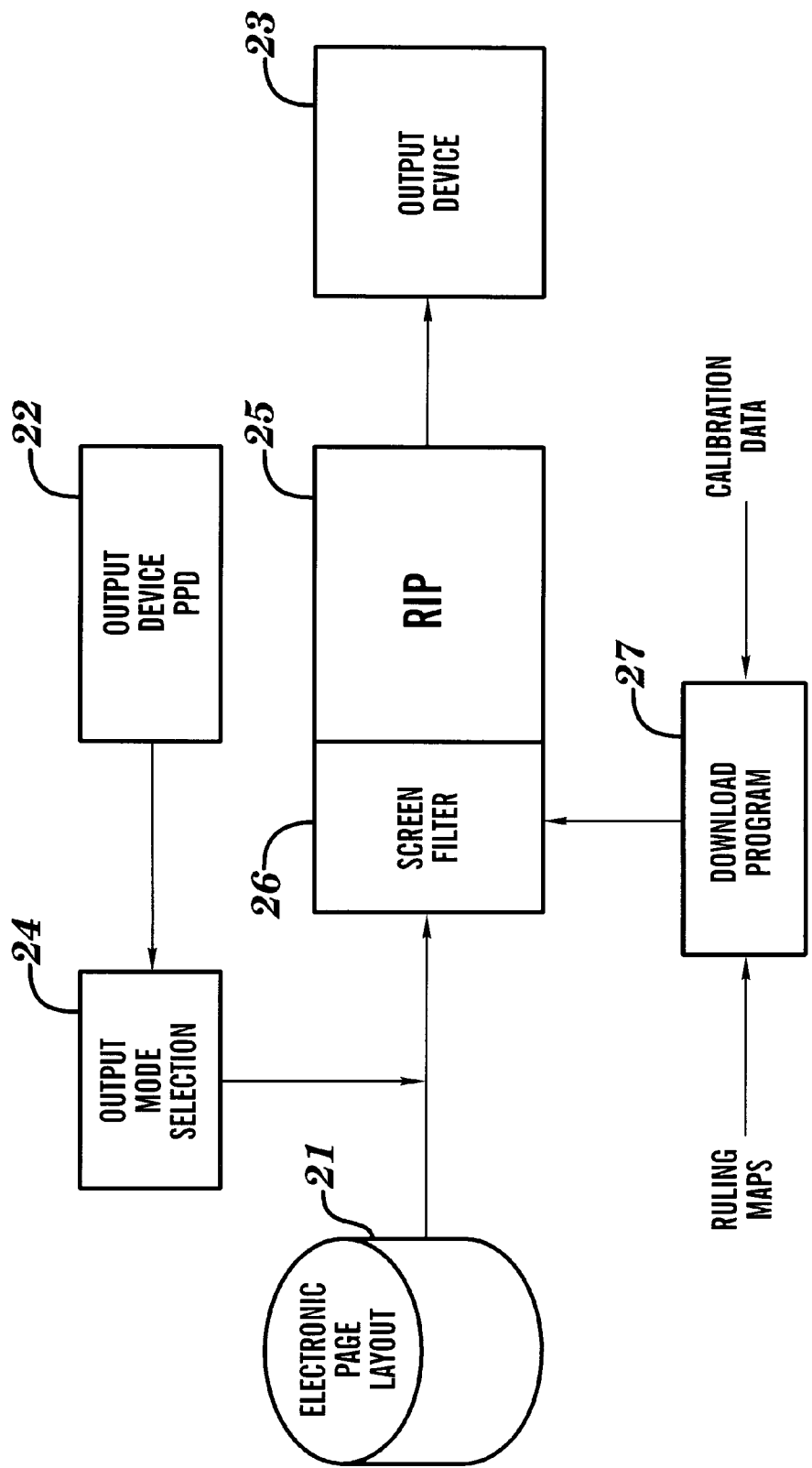

The invention is described hereinafter by way of examples with reference to the accompanying figures wherein:

FIG. 1 shows a system suitable for carrying out a method according to the current invention FIG. 2a shows a Ruling Map for Agfa Balanced Screening FIG. 2b shows a Ruling Map for Accurate Screening FIG. 2c shows a Ruling Map for Standard Screening We will first describe how in a preferred embodiment the output mode of an output device is set in a user friendly way by using ruling maps. Then we will describe which output mode parameters are preferentially used in selecting a transfer function. After that we will discuss how ruling maps can be created, and finally how a transfer function is preferentially created.

A. Setting Device Output Mode

There are two separate tasks when printing from an application:

1. generate the device-independent page description; and,
2. request that the page description be printed on a particular device. At this point, the user has an opportunity to add processing options, including device-dependent options, to the page description.

A preferred embodiment can be sketched by way of an example, where a layout designer as a client of a printing service bureau prepares an electronic page layout. By using Adobe PAGEMAKER and Adobe PHOTOSHOP (both tradenames of Adobe Inc), the electronic page layout may be stored on a floppy disk as an EPSF (EPS file, encapsulated PostScript file, see PostScript Language Reference Manual, Appendix H). An EPSF is a final-form print file containing a device-independent page description that does not know anything about the printer on which it will be imaged. Ideally, that file does not contain unnecessary device-dependent processing options. Specific resource needs, such as halftones, are carefully preserved and addressed. Once this EPS file is transmitted to the printing service bureau, an operator starts an application program. The path which is followed by the data is sketched in FIG. 1. The electronic page layout (21), preferentially stored on a magnetic disk is merged with data from a PostScript printer description PPD file (22), specific for the output device (23). The operator selects specific portions or settings from the PPD file (22) during the output mode selection step (24). The electronic page layout data, together with output device specific settings, is sent to the Raster Image Processor (RIP) (25), which is equipped with a screen filter (26). The screen filter preferentially comprises device specific ruling maps and transfer functions, which are consulted by the screen filter to introduce into the data stream device specific data such as a suitable threshold matrix, device resolution settings, transfer function. The device specific ruling maps and transfer functions, derived from calibration data, may be previously downloaded in the screen filter (26) by a download program (27). All the aspects of this improved RIP system are further set out below. The application program, started by the operator, imports the EPS file and creates a printer specific PostScript language page description. This application produces the PostScript language code for the output device, setting up a raster output device in order to fulfil the processing requirements of a page description. The operator selects a suitable output device and then defines device-specific options which may be:

1. Selecting the proper media on which the image must be rendered.
2. Establishing device dependent rendering parameters for producing output on the media.

According to PostScript, device dependent control operators are typically defined in a device specific "statusdict" dictionary, installed by a system administrator and maintained in the specific output device. In order to use statusdict features specific for the output device, the application program can extract information from a PostScript printer description (PPD) file. A PPD file is specific for each output device. Thus, selecting an output device is done by specifying the PPD for that device. The output device is thus decisive on which PPD file must be used, if a set of PPD files is present on the workstation running the application for the operator.

In a preferred embodiment for applying the method according to the current invention, the PPD contains at least one or a set of ruling maps. A ruling map is a list or data-base, more precisely a dictionary, which gives a relation between screening parameters, such as output device resolution and screen ruling, and a data-structure (referred to by e.g. a filename or keyword) comprising device specific data with respect to the screening parameters. Device specific data may be a device specific threshold matrix suitable for screening a contone image, a transfer function etc. If the output device can render on two different media, e.g. photographic film and paper, preferentially at least two ruling maps are present in the PPD, one for film and one for paper. Also if different screening technologies are used, different ruling maps may be created. In the PostScript example in FIG. 2a, FIG. 2b and FIG. 2c, three ruling maps are shown. Referring to the PostScript "defineresource" command, the category is "/RulingMap", the three different keys are:

"/AgfaBalanced" (see FIG. 2a)

"/Accurate" (see FIG. 2b) and

"/Standard" (see FIG. 2c)

The instances are PostScript Level 2 dictionaries, having output device resolution as key (e.g. 0, 1200, 1800, 2400) and a sub-dictionary as value. Each sub-dictionary has a line ruling as key (e.g. 65, 75, 150, 105, . . . ) and a screening-identification as value (e.g. ABS_TRAD_1200_65_RND). Thus the application program lets the operator select a specific ruling map from the set of ruling maps on the basis of the output media and the required screening technology. Once the appropriate ruling map is selected, a set of output device resolutions—actually the primary keys of the selected ruling map dictionary—will be offered to the operator. The operator makes his choice and is then offered a set of line rulings, available for the selected output device resolutions. Each available line ruling is a key of the sub-dictionary according the output device resolution. The result is now a screening-identification that reflects the operators options. Preferentially a specific naming convention is adhered to, wherein the screening-identification is composed of one to five fields, each field being descriptive for a specific screening parameter:

1. Screening technology such as:
   ABS: Agfa Balanced Screening
   CR: Agfa CristalRaster
   AS: Accurate Screening
   STD: Standard Screening
2. Indication of a combination of screening angles used, such as:
   TRAD: Traditional screening angles (150°, 75°, 135°, 0°)
   GRAV: Screening angles specially suited for gravure printing
   FLEX: Screening angles specially suited for flexography, such as 7.5° etc.
3. Device resolution or microdot size:
   1200, 1800, . . . : device, engine or recorder resolution in dots per inch.

21, 28, 31, . . . : microdot size in micrometer for frequency modulation halftoning. This size can be achieved by setting mechanical options in the recorder or by replication of microdot signals.

4. Line ruling 65, 75, . . . : number of halftone dots per inch along a direction defined by screening angle in autotypical screen.

5. Dot shape, such as:
RND: Round halftone dots
ELL: Elliptical halftone dots
LIN: Linear shaped halftone dots 6. Type of pre-compensation for gradation on the threshold array, specific for Agfa CristalRaster
UNC: No pre-compensation
PCi: Different degrees of pre-compensation The operators choice of output mode in the preferred embodiment thus comprises;

media type screening technology device resolution or microdot size line ruling and may further comprise:

dot shape set of screening angles degree of pre-compensation microdot replication By the outcome of the selection, namely the screening-identification, the device specific screening parameters are established. The screening-identification is included in the resulting printer specific PostScript file, which is sent to the RIP (Raster Image Processor) for the output device.

B. Selecting a Transfer Function

With each screening-identification corresponds a specific screening method for the output device. If the output device is not compensated properly, it gives different output density results for the same electronic images. Therefore, in a preferred embodiment of the method according to the current invention, a set of transfer functions is stored in the RIP. As will be discussed in section D, each transfer function is especially suited for a screening method according to specific screening parameters. The screening-identification is decisive for which transfer function will be selected. Preferentially, the name of the appropriate transfer function is a concatenation of:

1. Ruling map name: E.g. standard, accurate, Agfa balanced, ABSfilm, ABSpaper, . . .
2. Output device resolution e.g.: 1200, 1800 2400, 3000, 3600 dpi.
3. Effective line ruling: e.g. 150 lpi (lines per inch).
4. Screening angle: e.g. 0°, 15°, 45°, 75°.
5. Dot shape: e.g. RND for round, ELL for elliptical.
6. Photometric interpretation: positive or negative (POS/NEG).

Following names for transfer functions may be established:

Standard_2400_120_00_ELL_POS
Standard_2400_120_15_ELL_POS
Standard_2400_120_45_ELL_POS
Standard_2400_120_75_ELL_POS
AgfaBalanced_2400_150_00_RND_POS
AgfaBalanced_2400_150_15_RND_POS -continued AgfaBalanced_2400_150_45_RND_POS
AgfaBalanced_2400_150_75_RND_POS
ABSFilm_2400_21_00_ELL_NEG
ABSFilm_2400_21_15_ELL_NEG
ABSFilm_2400_21_45_ELL_NEG
ABSFilm_2400_21_75_ELL_NEG The first set corresponds with standard screening for an output device with a resolution of 2400 dpi. The line ruling of the screen is 120 lpi and traditional screening angles are used: 0°, 15°, 45° and 75°. Usually 0° is used for screening the yellow component, 15° for the cyan, 45° for black and 75° for magenta. Each time a specific colour component (cyan, magenta, yellow or black) is transmitted to the Raster Image Processor (RIP), the screening angle for that colour component is found in the appropriate halftone dictionary and that screening angle is thus used for the concatenation of the name of the transfer function. As can further be seen from the four names in the first set, an elliptical dot shape was selected and the selected transfer function is especially suited to compensate for a positive image.

The second set uses the Agfa Balanced Screening technology at the same device resolution as the first set, however with a line ruling of 150 lpi and round shaped halftone dots.

According to the third set, the ruling map name not only specifies the screening technology (Agfa Balanced Screening), but also the output media, on which the electronic image is rendered, i.e. film. The device resolution is 2400 dpi. The unusual line ruling of 21 lpi indicates that Agfa CristalRaster screening technology is used. The angle-field has no real meaning for this type of screening technology but merely differentiates between the different threshold arrays that must be used for different colour components. The value 00 corresponds with the threshold array for the yellow colour component, 15 with cyan, 45 with black and 75 with magenta. Different colour components to be printed on top of each other preferentially have different threshold arrays in the frequency modulated CristalRaster screening technology, and may need each a different transfer function. The ELL field can be seen as a place-holder because in frequency modulation halftoning there is no concept of a halftone dot shape, such as in autotypical screening. Alternatively, the halftone dot shape entry can be used to differentiate other parameters of the frequency modulation halftoning. The photometric interpretation is an important tool to differentiate between positive or negative output.

Via the above naming convention, appropriate transfer functions are selected from the set of available transfer functions and in order to prepare a PostScript Level 2 compatible data stream, the transfer functions are preferentially incorporated in a type 5 halftone dictionary. These transfer functions will—during halftoning—override any transfer function set by the PostScript "setcolortransfer" command.

From the discussion above, it is thus clear that the screening technology, the output media, the device resolution, the line ruling, the screening angle or colour component, the spot function and/or photometric interpretation may be used to select the transfer function. By linking this transfer function with the specific screening method to be applied, all process parameters are identified in order to convert an electronic image to one or more rendered halftone images.

C. Creating Ruling Maps

A set of ruling maps is preferentially delivered with the output device. A ruling map is preferentially a dictionary. The keys in the dictionary may be resolutions, the values are dictionaries, further on called resolution sub-dictionaries. Each resolution sub-dictionary may have line rulings for keys and names of halftone resources as values. As sketched under paragraph A, when setting device output mode, a name of a halftone resource can be ABS_TRAD_1200_65_RND. This name refers to a halftone dictionary, for which the keys are colour component names, such as cyan, magenta, yellow and black, and the values are dictionaries specifying the frequency or line ruling, the angle at which the halftone dots are laid out, the spotfunction or the threshold array and a default transfer function, which will be overruled by a transfer function found according to the method of the current invention.

If the need exists to get specific calibration curves for a specific output medium, preferentially a ruling map is copied to a ruling map with a different name, which is descriptive for the screening technology and the output medium, e.g. ABSpaper. The keys, which present the resolutions, can be left unchanged together with the arrangement of the resolution sub-dictionaries. The keys of the resolution sub-dictionaries are left unchanged, along with the names of the halftone dictionaries. This means that, as far as screening as such is concerned, the same parameters will be applied for the specific output medium as for the default settings. However, as the transfer function name is created from the ruling map name, which is ABSpaper, different transfer functions can be accessed by this method. In the next section "D. Transfer function generation" is discussed how these different transfer functions are generated.

If the operator wants for the new ruling map ABSpaper just one specific device resolution, just the dictionary entry with that device resolution can be kept, while all others are erased. If furthermore the choice of line rulings must be restricted, appropriate entries in the resolution sub-dictionary can be omitted. Or, if for the specific output media another screening technology must be offered, the halftone dictionary reference can be altered: e.g. ABS_TRAD_1200_120_RND can be changed to ABS_FLEX_1200_120_RND. A halftone dictionary with that new name must then be created, but can be copied from the original one and be given the changed name. The new (copied) halftone dictionary can then be edited to e.g. change the screening angles. A system administrator can then set these screening parameters to define the appropriate transfer functions as described in the next section, and these transfer functions will be selected automatically for an operator requesting this output media with the appropriate screening parameters.

D. Transfer Function Generation

In order to create a set of transfer functions that are suited for the screening parameters set by the operator, preferentially a calibration is performed for each set of screening parameters offered to the operator. If the operator is satisfied with the calibration, the corresponding transfer function is stored within the Raster Image Processor and will be automatically selected and applied by the Raster Image Processor.

The calibration process is preferentially established by a system administrator, who is responsible for a specific output device, by using an application program suited for this job. A suitable application program is CALIBRATOR 4.0 (trademark of Agfa-Gevaert N.V. in Mortsel, Belgium). This program is intended to linearize PostScript printing devices such as image setters (e.g. Avantra, SelectSet sold by Agfa Division of Bayer Corporation in Wilmington, Mass.), black and white laser printers (e.g. Agfa P400PS) and colour printers (e.g. Agfa XC-305). With respect to image setters, the most important usage of Calibrator is to compensate against dot gain and to control tone rendering. In the light of the current invention, Calibrator creates halftone linked transfer resources which is a set of transfer functions that depends on characteristics such as screening, resolution and separation.

A feature which is more elaborate than linearizing the device, is the option of the administrator to calibrate the output device towards a predefined goal curve. Even if this curve is non-linear, we will further on use linearization for calibration towards such curve.

The creation of a transfer function is preferentially established by the following steps.

First the device to be linearised is selected. Although transfer functions from other devices can be used in an output device of the same type, preferentially each output device gets its own set of transfer functions.

Then the output mode for the device must be specified. As described above, the PPD (PostScript printer description) file contains references to the possible output modes. These PPD files reflect the ruling maps and the halftone dictionaries present in the Raster Image Processor of the output device. The system administrator thus selects within the capabilities offered by the PPD one or more of the following parameters:

1. Desired ruling maps descriptive for the screening technology (e.g. Standard, Accurate Screening, Agfa Balanced Screening, Agfa CristalRaster) and/or output media (film, paper, transparency).
2. Resolution of the engine of the output device.
3. Line ruling for autotypical screens in lines per inch.
4. Screening angle for autotypical screens.
5. Spotfunction or dot shape: round, elliptical, linear.
6. Video mode: positive or negative image output.
7. Threshold array.

The parameters, that are fixed in this step, preferentially comprise all parameters that influence the transformation from grey levels to density on the output medium.

Once all or at least one of the above parameters are fixed, a reference test page is rendered by the output device, according to these parameters. The test page may be a blank page having blocks of varying density values or varying dot percentages as grey levels. Preferentially 21 grey levels are selected between 0 and 100%. The grey levels may be selected equidistant or be chosen according to a function that assigns more grey levels to a region where the density changes faster as a function of a varying grey level. The grey levels that are assigned to the blocks are also referred to as the device stimuli. QuickDraw can be used to generate the data stream of PostScript commands to generate the reference test page. The blank page can also be replaced by a more realistic output image, which may be required if the density is not fully place-independent. The blocks having specific stimulus values replace similar portions of the image.

Once the reference test page has been printed the reference blocks may be measured manually by a densitometer. The measured density values may be entered via a spreadsheet-like interface in a table, according to the corresponding stimulus values. The measurement may be done by an automatic densitometer such as an X-RITE DTP51 (trademark). This delivers a tab-delimited file, which is entered automatically in the spreadsheet. Alternatively, the rendered reference test page may be scanned by an electronic scanner and may be transmitted to the Calibrator application program via a TIFF file. As such, the measured density values become available for the application.

The system administrator has now the option to define wanted density values or dot percentages. Usually, a linear behaviour is requested for the output device, i.e. the density must be a linear function of the grey level. In that case, the stimulus values must be copied to the wanted values. This option however allows the system administrator to impose required non-linear density variations or a required dot gain.

The next step is performed by the application program: a calibration curve, which is a transfer function obtained by the calibration process such as the one described here, is computed based upon the stimulus values, the measured values and the corresponding wanted density values. The curve is obtained by linear interpolation, spline interpolation, linear regression or spline approximation.

In a last step, the calibration curve or transfer function is saved in specific format such as a transfer resource according to PostScript level 2, a PPD-file for a printer, a PhotoShop transfer file, a default curve for a printer, or a tab-delimited file. A transfer function may also be incorporated in a color profile such as a COLORSYNC 2.0 (a trade mark of the ColorSync Profile Consortium), an ICC PROFILE (trademark of International Color Consortium) or a COLORTAG according to FOTOTUNE (both trademarks of Agfa-Gevaert N.V. in Mortsel, Belgium). For applying the method according to the current invention, the transfer function is preferentially stored as a halftone linked transfer resource on a Raster Image Processor (RIP). This storage operation can be done by AGFASET 3.1 (trademark of Agfa-Gevaert A.G.) on a RIP that supports PSE 11.0 (Agfa-Gevaert N.V. trademark for PostScript Environment preprocessor).

For image setters or printers with limited capabilities, it is possible that most screening parameters are fixed. In such a case, it may be that the only selectable output mode is the output media type. However, also in that case, preferentially one transfer function is stored per output medium. After having selected the appropriate output medium, making up the output mode of the device, the correct transfer function can be selected, based upon the output medium type. The selected transfer function is then used for rendering images on the selected output medium.

If the output device allows for the choice between two types of CristalRaster, e.g. non-compensated and pre-compensated screening variations, preferentially a transfer function is established for each said types. The output mode is then characterised by the screening compensation parameter, which can be selected by the operator instructing the rendering operation. Based upon this screening parameter the appropriate transfer function is established and used for rendering images according to the selected compensation.

If just one line ruling is installed on an output device having a fixed recorder resolution, that device may be used to print separations for different colour components under different screening angles. Each screening angle may influence the rendered density of the output device in a different way. As such, for each screening angle it may be necessary to establish a transfer function, and apply this to the image data of each separation, based on the choice of the screening angle.

The same can be said for a device supporting different line rulings but always the same angle, or where the screening angle does not influence the grey reproduction behaviour of the output device as much as the line ruling. In that case, the choice of the transfer function may be based on the line ruling alone.

In cases where the dot shape (e.g. round, elliptical, linear, rhombic, . . . ) is the only screening parameter which can be freely chosen or that really influences e.g. the dot gain, the selection of the transfer function may be based upon the dot shape only.

If the device resolution is variable, and influences the output density, the device resolution may be used as a key for defining which transfer function must be selected to be applied to the image data.

For some screening technologies, one or more threshold arrays are pre-computed and have no specific parameters associated such as line ruling, screening angle etc. Therefore, the reference to this threshold array may define the selection of the transfer curve. If calibrated output is required, preferentially a reference test image as described above is rendered using the specific instance of the threshold matrix, the densities are measured and processed to deliver a calibration curve, which is then used in combination with this threshold matrix as a transfer function.

Dot size modulation halftoning and frequency modulation halftoning are halftoning techniques that have an important different dot gain, due to the circumference of halftone dots, which is substantially larger for frequency modulation halftoning than for dot size modulation. The choice of the transfer function to be applied to the image grey levels may therefore be based on the selection of the halftoning technique.

The colour in which a colour component is printed, is usually identified by its screening angle. For identification purposes. one could assign a screening "angle" to a threshold array or screening method used for a specific colour. Other ways may exist to identify the colour component.

It may be desirable to measure the density at the output of the recorder device directly, or after printing by the appropriate ink. This depends on the system administrator's option of which system must be linearised. This applies in fact to all parameters making up the output mode of the device.

The screening parameters as described above can be set interactively by a user, or selected from available options. These parameters may include a default transfer function. According to the method of the current invention, the screening parameters are decisive for the choice of a specific transfer function, and the set of screening parameters is linked to that transfer function. This link can be established by adding to the screening parameters a file reference, which points to the transfer function, or just an address pointer, pointing to the transfer function somewhere in memory. PostScript level 2 requires that the transfer function is incorporated in a halftone dictionary, in order to be applied to the image levels during the halftoning process.

As a transfer curve, each function for transforming image levels to device stimuli can be used. It does not matter how this function is established. In a preferred embodiment however, as described in section D, the transfer curve is the result of a calibration process, in which a reference image is rendered, measured and the measured density data are used to compute the transfer function. Each such transfer function may be based, in the most general case, on the output mode of the output device, or may be based more specifically on at least one screening parameter for a halftoning process applied on the image data.

To apply the method of the current invention, at least two transfer functions must be available. These are preferentially stored in a library, specific for the output device which has been calibrated.

Any combination of the above described parameters may be used to select the output transfer function.

Having described in detail preferred embodiments of the current invention, it will now be apparent to those skilled in the art that numerous modifications can be made therein without departing from the scope of the invention as defined in the following claims.

We claim:

1. A method for rendering by an output device a continuous tone image having multiple electronic grey levels, said method comprising the following steps:

establishing for said output device at least two different tone transfer functions, each tone transfer function for transforming each electronic grey level of said continuous tone image to a corresponding stimulus value for said output device, said transfer function being independent of the location of said electronic grey level in said continuous tone image, and the number of different stimulus values from said transfer function being substantially equal to the number of different electronic grey levels, each tone transfer function being dependent on an output mode of said output device;

selecting an output mode of said output device;

selecting at least one transfer function from said at least two different tone transfer functions, based upon said output mode; and, transforming said electronic grey levels of said continuous tone image by said selected one transfer function for rendering said continuous tone image by said output device.

2. A method for rendering a page image description for an output device, comprising the steps of:

(a) selecting a particular output device for rendering the page image said output device being capable of operating under a plurality of output modes;

(b) selecting a particular output mode of the output device for rendering the page image; and (c) selecting a tone transfer function specifically calibrated for rendering the page image with the output device and the particular output mode selected.

3. Method according to claim 2, wherein said output mode comprises at least one screening parameter for rendering said image by a halftoning process.

4. Method according to claim 3, wherein a screening parameter is a screening angle.

5. Method according to claim 3, wherein a screening parameter is a line ruling.

6. Method according to claim 3, wherein a screening parameter is a halftone dot shape.

7. Method according to claim 3, wherein a screening parameter is a device resolution of said output device.

8. Method according to claim 3, wherein a screening parameter is descriptive for a specific threshold matrix, used for rendering said image as a halftone image.

9. Method according to claim 3, wherein a screening parameter is a halftoning technology identification.

10. Method according to claim 3, wherein a screening parameter is a colour identification for a colour component of said image.

11. Method according to claim 3, further comprising the steps of:

said linking transfer function with at least one screening parameter in an electronic printer description file;

using said electronic printer description file for said halftoning process.

12. Method according to claim 2, wherein said output mode specifies an output medium on which said image is to be rendered.

13. Method according to claim 2, wherein said transfer function is based on a calibration curve, obtained by calibrating said output device working according to said output mode.

14. Method according to claim 13, wherein said transfer function is stored in a library specific for said output device.

15. A method according to claim 2 wherein the step of selecting a particular output device is completed by selecting an electronic printer description file.

16. A method according to claim 15 wherein the step of selecting a particular output device is completed by selecting a POSTSCRIPT printer description file.

17. A method according to claim 16 wherein the selection of the POSTSCRIPT printer description file automatically includes the selection of the tone transfer function.

18. A method according to claim 15 wherein the selection of the electronic printer description file automatically includes the selection of the tone transfer function.

19. A method according to claim 2 wherein the tone transfer function modifies the tone rendering characteristic of the output device according to a predetermined calibration curve.

20. A method according to claim 19 wherein the tone transfer function linearizes the tone rendering characteristic of the output device according to a predetermined calibration curve.

21. A method according to claim 2 wherein one of the plurality of tone transfer functions is established according to the steps of:

(a) rendering a reference test page image using the particular output device and the particular output mode to be selected, the reference test page image including a plurality of output device stimuli;

(b) measuring the rendered reference test page to determine a plurality of response values rendered by the output device in response to the plurality of corresponding output device stimuli;

(c) copying the plurality of response values to a corresponding plurality of wanted values;

(d) computing a calibration curve based upon the plurality of output device stimuli, the corresponding plurality of response values and the corresponding plurality of wanted values; and, (e) storing the calibration curve as one of the plurality of tone transfer functions.

22. A method according to claim 21 wherein the step of storing the calibration curve includes the step of including the calibration curve as a portion of a POSTCRIPT printer description file.

23. A method for rendering a page image on an output device, comprising the steps of:

(a) generating a page image description;

(b) selecting a particular output device for rendering the page image said output device being capable of operating under a plurality of output modes;

(c) selecting a particular output mode, of the output device, for rendering the page image; and (d) selecting a tone transfer function specifically calibrated for rendering the page image with the particular output device and the particular output mode selected.

24. A method according to claim 23 wherein the page image description comprises an electronic data file formatted in a page description language.

25. A method according to claim 23 wherein the page image description comprises an encapsulated POSTSCRIPT file.

26. An apparatus for rendering a page image, comprising:
   (a) an output device capable of rendering the page image in a plurality of output modes;
   (b) an electronic page layout system;
   (c) a storage device for storing a plurality of tone transfer functions, at least one for each of the plurality of output modes;
   (d) a device for selecting one of the plurality of output modes for rendering the page image; and,
   (d) a RIP connected between the electronic page layout system and the output device for formatting the page image for rendering by the output device and wherein one of the plurality of tone transfer functions is used to format the page image for rendering by the output device in accordance with the output mode selected.

27. An apparatus according to claim 26 wherein the page image to be rendered is a contone page image file and wherein the apparatus further comprises; a screen filter for formatting the contone page image for rendering by the output device as a halftone page image.

28. An apparatus according to claim 26, wherein; a ruling map and a plurality of calibration curves are stored on the storage device and wherein each of the plurality of calibration curves is obtained by operating the output device according to one of the plurality of output modes and wherein a tone transfer function is applied to the page image to be rendering by the output device by automatically applying one of the plurality of calibration curves to the ruling map in accordance with the output mode desired.

29. An apparatus according to claim 26 wherein the plurality of tone transfer functions comprise a plurality of calibration curves stored in the storage device, and wherein each of the plurality of calibration curves is obtained by operating the output device according one of the plurality of output modes, and wherein one of the plurality of calibration curves is automatically applied to the page image for rendering by the output device in accordance with the output mode desired.

30. An apparatus according to claim 26 wherein the storage device for storing the plurality of tone transfer functions is included in the RIP.

31. An apparatus according to claim 30 wherein the RIP is included in the electronic page layout system.

* * * * *